(12) United States Patent
Kuhlmann et al.

(10) Patent No.: US 9,255,801 B2
(45) Date of Patent: Feb. 9, 2016

(54) YAW RATE SENSOR

(71) Applicants: Burkhard Kuhlmann, Reutlingen (DE); Rolf Scheben, Stuttgart (DE); Daniel Christoph Meisel, Reutlingen (DE); Benjamin Schmidt, Stuttgart (DE); Thorsten Balslink, Kirchentellinsfurt (DE)

(72) Inventors: Burkhard Kuhlmann, Reutlingen (DE); Rolf Scheben, Stuttgart (DE); Daniel Christoph Meisel, Reutlingen (DE); Benjamin Schmidt, Stuttgart (DE); Thorsten Balslink, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 265 days.

(21) Appl. No.: 13/922,801

(22) Filed: Jun. 20, 2013

(65) Prior Publication Data
US 2013/0340522 A1 Dec. 26, 2013

(30) Foreign Application Priority Data

Jun. 20, 2012 (DE) .......................... 10 2012 210 374

(51) Int. Cl.
*G01P 3/44* (2006.01)
*G01C 19/56* (2012.01)
*G01C 19/5747* (2012.01)

(52) U.S. Cl.
CPC ............ *G01C 19/56* (2013.01); *G01C 19/5747* (2013.01)

(58) Field of Classification Search
CPC .................................. G01P 3/44; G01C 19/56
USPC ......................................................... 73/504.12
See application file for complete search history.

(56) References Cited

U.S. PATENT DOCUMENTS

| 6,752,017 | B2* | 6/2004 | Willig | G01C 19/5747 73/504.04 |
| 2004/0123660 | A1* | 7/2004 | Willig et al. | 73/504.12 |
| 2010/0192690 | A1* | 8/2010 | Classen et al. | 73/504.12 |
| 2011/0185813 | A1* | 8/2011 | Classen | G01C 19/5747 73/504.13 |
| 2013/0340522 | A1* | 12/2013 | Kuhlmann | G01C 19/5747 73/504.12 |

FOREIGN PATENT DOCUMENTS

WO      03 064975      8/2003

\* cited by examiner

*Primary Examiner* — Hezron E Williams
*Assistant Examiner* — Mark A Shabman
(74) *Attorney, Agent, or Firm* — Kenyon & Kenyon LLP

(57) ABSTRACT

A yaw rate sensor, including a substrate and a main extension plane, for detecting a yaw rate around a first direction in parallel to the main extension plane, a first Coriolis mass, and a second Coriolis mass, and a drive device configured to drive the first and second Coriolis masses in parallel to a drive direction perpendicular to the first direction, the first and second Coriolis masses, for a yaw rate around the first direction, experiencing a Coriolis acceleration in parallel to a detection direction, which is perpendicular to the drive and first directions, the first and second Coriolis masses having first/second partial areas and third/fourth partial areas, respectively. The first and third partial areas are farther from the axis of symmetry in parallel to the first direction, and the second and fourth partial areas are closer to the axis of symmetry in parallel to the first direction.

8 Claims, 3 Drawing Sheets

YAW RATE SENSOR

RELATED APPLICATION INFORMATION

The present application claims priority to and the benefit of German patent application no. 10 2012 210 374.0, which was filed in Germany on Jun. 20, 2012, the disclosure of which is incorporated herein by reference.

FIELD OF THE INVENTION

The present invention is directed to a yaw rate sensor.

BACKGROUND INFORMATION

Yaw rate sensors are known from the related art. For example, a yaw rate sensor having two oscillating mass elements is discussed in publication WO 03064975 A1. Micromechanical yaw rate sensors for measuring yaw rates around a direction in parallel to the main extension plane of the substrate of the sensor are typically configured with planar oscillating masses or as masses rotating in the plane, which experience a Coriolis force in a detection direction, i.e., perpendicularly to the main extension plane, upon the occurrence of a rotational movement around the direction in parallel to the main extension plane. This Coriolis force is either ascertained via the electrostatic counterforce required for the location feedback (closed-loop regulation) or, for example, measured via the capacitance change due to the distance change to the substrate (open-loop operation).

Such yaw rate sensors may have two oscillating masses (partial oscillators), which are driven into an anti-parallel mode. If a yaw rate is present, an anti-parallel detection oscillation is initiated by the Coriolis force, which is capacitively detected and converted into a yaw rate with the aid of analysis electronics. It is related art that a partial oscillator is constructed from a drive oscillator and a Coriolis oscillator. The drive oscillator only participates in the drive movement and not in the detection oscillation. The Coriolis element participates in both the drive oscillation and the detection oscillation.

In addition to the Coriolis force, there are further forces for practically relevant usage cases, to which sensors or parts thereof are subjected and which may also induce a signal or which could corrupt the signal assigned to the Coriolis force, in particular inertial forces induced by linear accelerations and by rotational accelerations. The occurrence of these forces disadvantageously results in false signals during operation, because, for example, a rotational acceleration, for example, in the form of a rotational oscillation around the sensitive axis, directly results in a yaw rate signal. In particular if the rotational oscillation occurs at the frequency at which the yaw rate sensor is driven and occurs in phase with a Coriolis force, a particularly large possibility for interference results.

SUMMARY OF THE INVENTION

It is therefore an object of the exemplary embodiments and/or exemplary methods of the present invention to provide a yaw rate sensor and a method for operating a yaw rate sensor which do not have the disadvantages of the related art and which are insensitive to both linear accelerations in parallel to the detection direction and to rotational accelerations according to the sensitive direction of the yaw rate sensor.

According to the present system, a yaw rate sensor is provided including a substrate, which has a main extension plane, for detecting a yaw rate around a first direction extending in parallel to the main extension plane, the yaw rate sensor having a drive device, a first Coriolis mass, and a second Coriolis mass, the drive device being configured to drive the first Coriolis mass and the second Coriolis mass in parallel to a drive direction extending perpendicularly to the first direction, the first Coriolis mass and the second Coriolis mass, for a yaw rate around the first direction, experiencing a Coriolis acceleration in parallel to a detection direction, which is both perpendicular to the drive direction and perpendicular to the first direction, the first Coriolis mass having a first partial area and a second partial area, the second Coriolis mass having a third partial area and a fourth partial area, the first and third partial areas being situated farther away from the axis of symmetry extending in parallel to the first direction, and the second and fourth partial areas being situated closer to the axis of symmetry extending in parallel to the first direction, a first electrode, which forms a first capacitance with the first partial area, being situated opposite to the first partial area, a second electrode, which forms a second capacitance with the second partial area, being situated opposite to the second partial area, a third electrode, which forms a third capacitance with the third partial area, being situated opposite to the third partial area, a fourth electrode, which forms a fourth capacitance with the fourth partial area, being situated opposite to the fourth partial area, the attachment of the first and second Coriolis masses on the substrate or on the drive device and the arrangement and configuration of the first, second, third, and fourth electrodes being provided in such a way that, in case of a rotational acceleration around the first direction, the changes, which are caused by deflections of the first, second, third, and fourth partial areas in parallel to the detection direction, of either the first and third capacitances and the second and fourth capacitances or the first and second capacitances and the third and fourth capacitances, mutually compensate for one another.

In particular, the yaw rate sensor according to the present invention as described herein has the advantage over the related art that it is less sensitive in relation to interfering accelerations in the form of rotational accelerations with respect to rotations around a direction which corresponds to the first direction (i.e., the direction which corresponds to the sensitive or measuring direction of the yaw rate sensor), and in the form of linear accelerations in parallel to the detection direction of the yaw rate sensor, or that the effect of such interfering accelerations may be differentiated from the effect of the actual yaw rate to be detected around the particular direction. According to the exemplary embodiments and/or exemplary methods of the present invention, the Coriolis masses are configured or attached (on the substrate or on the drive device) and the first, second, third, and fourth electrodes are configured in such a way that in the event of a rotational acceleration around the sensitive direction, i.e., around the first direction, the changes caused by deflections of or the force action on the first, second, third, and fourth partial areas of the Coriolis masses in a direction in parallel to the detection direction either of the first and third capacitances and the second and fourth capacitances or of the first and second capacitances and the third and fourth capacitances mutually compensate for one another.

In this way, advantageously, due to the mechanical configuration of the yaw rate sensor (in the form of the suspension or the attachment of the Coriolis mass on the substrate or on the drive device and in the form of the configuration of the first, second, third, and fourth electrodes) and by the electrical interconnection of the yaw rate sensor (in the form of the resulting measuring signal of the capacitance changes of the first, second, third, and fourth capacitances in the event of deflection of or force action on the first, second, third, and fourth partial areas), rotational accelerations have no influence at all on the measuring signal to be analyzed or are only incorporated in extremely suppressed form in this measuring signal.

According to the exemplary embodiments and/or exemplary methods of the present invention, the yaw rate sensor is configured in such a way that a yaw rate around a first direction extending in parallel to the main extension plane of the substrate is detected (i.e., the case of an $\Omega_x$ sensor or an $\Omega_y$ sensor, therefore a yaw rate sensor whose sensitive direction is a rotation around a first direction extending in parallel to the main extension plane). In this case, the drive device is provided in such a way that the first Coriolis mass and the second Coriolis mass are driven in parallel to the drive direction extending perpendicularly to the first direction, the drive direction also extending in parallel to the main extension plane. The detection direction extends perpendicularly to the main extension plane.

Embodiments and refinements of the present invention may be derived from the subclaims, and also the description with reference to the drawings.

According to one of the exemplary embodiments and/or exemplary methods of the present invention, it is provided that the drive device has a first drive element and a second drive element, the first drive element driving the first Coriolis mass in parallel to the drive direction, and the second drive element driving the second Coriolis mass in parallel to the drive direction, the first Coriolis mass being configured to be tiltable relative to the first drive element around a first tilting axis in parallel to the first direction, and the second Coriolis mass being tiltable relative to the second drive element around a second tilting axis in parallel to the first direction. It is thus advantageously possible to compensate particularly well for the effect of an interfering rotational acceleration, in particular a rotational acceleration having frequency components in the frequency range of the drive oscillation, and therefore to differentiate it from a corresponding yaw rate.

According to another of the exemplary embodiments and/or exemplary methods of the present invention, it is provided that the first partial area and the second partial area have different masses per unit area in parallel to the main extension plane of the first Coriolis mass, and the third partial area and the fourth partial area have different masses per unit area in parallel to the main extension plane of the second Coriolis mass, or the mass per unit area of the first Coriolis mass in parallel to the main extension plane decreases with increasing distance from the axis of symmetry of the yaw rate sensor extending in parallel to the first direction (in particular in inverse proportion to the square of the distance to the axis of symmetry), and the mass per unit area of the second Coriolis mass in parallel to the main extension plane decreases with increasing distance from the axis of symmetry of the yaw rate sensor extending in parallel to the first direction. It is thus advantageously provided according to the exemplary embodiments and/or exemplary methods of the present invention to cause different movement behavior or a different deflection or at least (in particular in closed-loop systems) a different force action on the first and third partial areas or on the second and fourth partial areas of the first and second Coriolis masses for the case of a rotational acceleration, on the one hand, and a yaw rate, on the other hand, so that in cooperation with the embodiment of the electrode system of the first, second, third, and fourth electrodes, suppression or compensation (in the measuring signal) of the effect of a rotational acceleration results.

According to another of the exemplary embodiments and/or exemplary methods of the present invention, it is provided that in the case of a rotational acceleration around the first direction, the deflection or force action—in parallel to the detection direction—of the first partial area and the third partial area is greater than the deflection or force action—in parallel to the detection direction—of the second partial area and the fourth partial area, and the area in parallel to the main extension plane of the first electrode and the third electrode is smaller than the area in parallel to the main extension plane of the second electrode and the fourth electrode, or in the case of a rotational acceleration around the first direction, the deflection or force action—in parallel to the detection direction—of the first partial area, the second partial area, the third partial area, and the fourth partial area is equal in amount, and the area in parallel to the main extension plane of the first electrode, the second electrode, the third electrode, and the fourth electrode is equal in size.

It is thus advantageously possible according to the present invention to compensate for the effect of a rotational acceleration in the measuring signal.

According to another refinement of the exemplary embodiments and/or exemplary methods of the present invention, it is provided that the first Coriolis mass is connected to the first drive element with the aid of a first torsion suspension in the area of the first tilting axis, and the second Coriolis mass is connected to the second drive element with the aid of a second torsion suspension in the area of the second tilting axis. It is thus advantageously possible according to the exemplary embodiments and/or exemplary methods of the present invention that a particularly simple and nonetheless robust mechanical structure of the yaw rate sensor is implementable.

According to another embodiment, it is provided that the drive device is configured to drive the first Coriolis mass and the second Coriolis mass each in opposite directions to one another in the drive direction or that the drive device has a drive frame, the drive frame having four angled elements, which are attached in the corners of the frame so they may be rotationally deflected on the substrate, two of the angled elements each being connected to one another via a U-shaped spring element.

Exemplary embodiments of the present invention are shown in the drawings and explained in greater detail in the following description.

DETAILED DESCRIPTION

Figure 1:
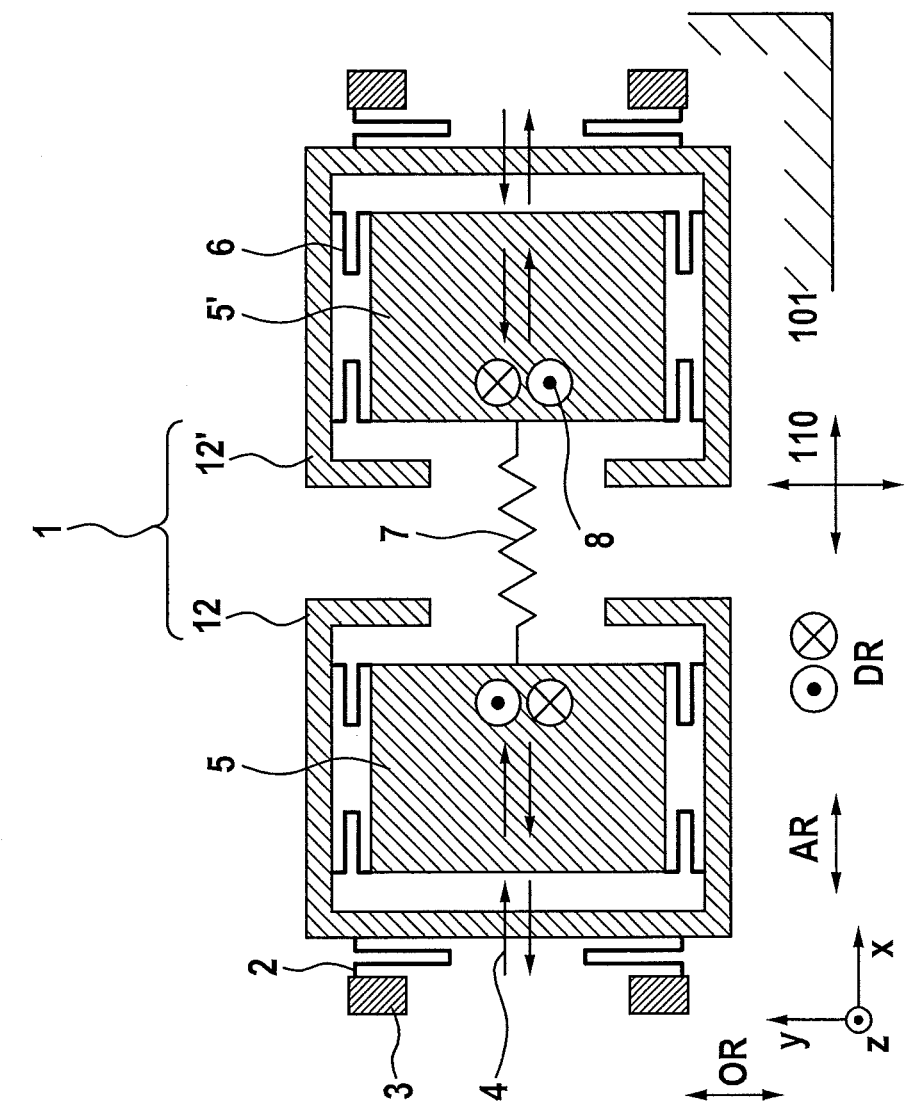
FIG. 1 shows a schematic diagram of a conventional yaw rate sensor as an $\Omega_y$ sensor according to the related art.

Identical parts are always provided with identical reference numerals in the various figures and are therefore also generally only cited or mentioned once in each case.

FIG. 1 shows a schematic diagram of a conventional yaw rate sensor 100, which is micromechanically manufactured in particular, and which is provided for detecting yaw rates around a first direction OR (in the example of FIGS. 1 and 2 of an $\Omega_y$ sensor, this corresponds to the y axis), and which is implemented on a substrate 101, which has a main extension plane 110 and which also specifies this plane for the sensor or yaw rate sensor. Such yaw rate sensors include two oscillating masses (partial oscillators), which are driven into an antiparallel mode along a drive direction AR (in the example of FIG. 1, this corresponds to the x axis), which is perpendicular to first direction OR. If a yaw rate exists, an antiparallel detection oscillation (in parallel to a detection direction DR, which is both perpendicular to first direction OR and perpendicular to drive direction AR) is initiated by the Coriolis force, which is capacitively detected and converted into a yaw rate with the aid of analysis electronics.

Substrate 101 and main extension plane 110 are only shown in FIG. 1, but are similarly present in all FIGS. 1 through 5, since all of these figures show top views of the sensor structures, i.e., the plane of the drawing corresponds to main extension plane 110. Such a partial oscillator of a yaw rate sensor conventionally includes a drive oscillator as drive device 1 and a Coriolis oscillator as a first Coriolis mass 5. The other partial oscillator includes a second Coriolis mass 5'. Drive device 1 includes a first drive element 12 and a second drive element 12' and drives first Coriolis mass 5 with the aid of first drive element 12 and drives second Coriolis mass 5' in parallel (and according to the anti-parallel oscillating mode) to drive direction AR with the aid of the second drive element.

In the yaw rate sensor according to FIG. 1, the drive oscillator is anchored with the aid of springs 2 via anchor points 3 on substrate 101. Springs 2 are U-shaped and are soft along the x direction (in the example corresponding to drive direction AR). Along the y direction (in the example, corresponding to first direction OR), they are stiff. They are also stiff along the z direction (in the example corresponding to detection direction DR), in that the layer thickness is configured to be greater than the bar width. Drive device 1 is in particular electrostatically driven in resonance with its natural frequency with the aid of interdigital structures (not shown). Arrows 4 point in the direction of the drive movement, the partial oscillators, i.e., first and second Coriolis masses 5, 5', oscillating in counter phase in relation to one another, i.e., one partial oscillator moves—at least partially—in the negative x direction when the other partial oscillator moves—at least partially—in the positive x direction and vice versa.

First and second Coriolis masses 5, 5' are connected to drive device 1 via coupling springs 6, so that first and second Coriolis masses 5, 5' may execute both drive movement 4 and detection movement 8. The detection movement along the z axis occurs due to a Coriolis acceleration or Coriolis force, which results from yaw rate $\Omega_y$ around the y axis and velocity $v_x$ along the x axis according to $F_{Coriolis}=2*m*v_x \times \Omega_y$ (vectorial cross product). Both the drive movement and the detection movement of the two partial oscillators are coupled with the aid of a coupling structure 7 between first and second Coriolis masses 5, 5'. The detection electrodes (not shown) are located, for example, below first and second Coriolis masses 5, 5' on substrate 101.

Conventional yaw rate sensors may have an acceleration sensitivity and a rotational acceleration sensitivity depending on the configuration. This means that a rotational acceleration, for example, in the form of a rotational oscillation around the sensitive axis (first direction OR, in the example the y axis), directly results in a yaw rate signal. In particular if the rotational oscillations occur at frequency $f_A$ (at which the yaw rate sensor is driven) and in phase with a Coriolis force, a particularly high susceptibility to interference results. A rotational acceleration around first direction OR (the y axis here) also results in an equivalent force, which typically may not be differentiated from a Coriolis force. Furthermore, a linear acceleration along detection direction DR (the z axis here) results in an unintentional deflection of first and second Coriolis masses 5, 5' or force action on first and second Coriolis masses 5, 5' along detection direction DR (in the example, the z axis).

According to FIGS. 2 through 5, a first (FIG. 2), a second (FIG. 3), a third (FIG. 4), and a fourth (FIG. 5) embodiment variant of a yaw rate sensor 100 according to the present invention are schematically shown in a top view of yaw rate sensor 100, i.e., the plane of the drawing corresponds to main extension plane 110. According to the exemplary embodiments and/or exemplary methods of the present invention, it is provided in all embodiment variants that first Coriolis mass 5 has a first partial area 9 and a second partial area 10, and second Coriolis mass 5' has a third partial area 9' and a fourth partial area 10'. In relation to an axis of symmetry of yaw rate sensor 100, which extends in parallel to first direction OR with respect to Coriolis masses 5, 5', first and third partial areas 9, 9' are situated farther away from the axis of symmetry extending in parallel to first direction OR than second and fourth partial areas 10, 10'.

A first electrode E9 (which is fixed in relation to the anchor points or the substrate in particular, which may be fixedly connected to the substrate) forms a first capacitance with first partial area 9 and is situated opposite to first partial area 9 (for example, above, below, or above and below and/or adjacent to the partial area). A second electrode E10 (which is fixed in relation to the anchor points or the substrate, which may be fixedly connected to the substrate) forms a second capacitance with second partial area 10 and is situated opposite to second partial area 10. A third electrode E9' (which is fixed in relation to the anchor point for the substrate in particular, which may be fixedly connected to the substrate) forms a third capacitance with third partial area 9' and is situated opposite to third partial area 9'. A fourth electrode E10' (which is fixed in relation to the anchor points or the substrate in particular, which may be fixedly connected to the substrate) forms a fourth capacitance with fourth partial area 10' and is situated opposite to fourth partial area 10'.

These electrodes are interconnected in particular to form total capacitances CP and CN and may form difference CP−CN. A yaw rate around first direction OR (this corresponds to the x direction in all embodiment variants) causes, due to the embodiment according to the present invention of first and second Coriolis masses 5, 5' (in particular due to the different attachments of Coriolis masses 5, 5' on substrate 101 or on first and second drive elements 12, 12') in all embodiment variants of the present invention, a different configuration of the force action due to the Coriolis force on first, second, third, and fourth partial areas 9, 10, 9', 10' of Coriolis masses 5, 5' in relation to the configuration of the force action of the rotational acceleration force on first, second, third, and fourth partial areas 9, 10, 9', 10' of Coriolis masses 5, 5' in the case of a rotational acceleration around first direction OR. This is shown in each case in the left part of FIGS. 2 through 5 on the basis of schematic arrow illustrations perpendicular to the plane of the drawing (together with the force action due to the linear acceleration in the detection direction (z direction) $a_z$ on first, second, third, and fourth partial areas 9, 10, 9', 10' of Coriolis masses 5, 5').

In this case, a larger circle having a spot in the middle symbolizes a greater force action or a greater deflection in parallel to the z direction (i.e., out of the plane of the drawing toward the observer), while a smaller circle having a spot in the middle symbolizes a lesser force action or a lesser deflection in parallel to the z direction (i.e., out of the plane of the drawing toward the observer). Furthermore, a larger circle having an X symbolizes a greater force action or a greater deflection antiparallel to the z direction (i.e., away from the observer into the plane of the drawing), while a smaller circle having an X symbolizes a lesser force action or a lesser deflection antiparallel to the z direction (i.e., away from the observer into the plane of the drawing).

The force actions on partial areas are listed hereafter. A force action is designated as equal if it is within the scope of a deviation of 10%, 20%, or 50%.

In the first embodiment variant (FIG. 2), in the case of a yaw rate $\Omega_x$ around the x direction (i.e., around first direction OR), the following configuration of the force action exists on first, second, third, and fourth partial areas 9, 10, 9', 10': for first, second, third, and fourth partial areas 9, 10, 9', 10', the following configuration of the force action exists: The force action on the first partial area is identical with respect to the absolute value and with respect to the direction of the force action on the second partial area, and the force action on the third partial area is identical with respect to the absolute value and with respect to the direction of the force action on the fourth partial area.

The force action on the first partial area is identical with respect to the absolute value and is opposite with respect to the direction of the force action on the third partial area. The force action is oriented along the z direction (i.e., along detection direction DR). In the case of a rotational acceleration $d\Omega_x/dt$ around the x direction (i.e., around first direction OR), the following configuration of the force action exists on first, second, third, and fourth partial areas 9, 10, 9', 10': The force action on the first partial area is identical with respect to the absolute value and is opposite with respect to the direction of the force action on the third partial area.

The force action on the second partial area is identical with respect to the absolute value and is opposite with respect to the direction of the force action on the fourth partial area. The force action on the first partial area is greater with respect to the absolute value and is identical with respect to the direction of the force action on the second partial area. The force action is oriented along the z direction (i.e., along detection direction DR). In the case of a linear acceleration in parallel to detection direction DR (z direction), the following configuration of the force action exists on first, second, third, and fourth partial areas 9, 10, 9', 10': The force action on the first, second, third, and fourth partial areas is identical in absolute value and direction. The force action is oriented along the z direction (i.e., along detection direction DR).

In the second, third, and fourth embodiment variants (FIGS. 3 through 5), therefore, in the case of a yaw rate $\Omega_x$ around the x direction (i.e., around first direction OR), the following configuration of the force action exists on first, second, third, and fourth partial areas 9, 10, 9', 10':

The force action on the first partial area is less with respect to the absolute value and is identical with respect to the direction of the force action on the second partial area and the force action on the third partial area is less with respect to the absolute value and is identical with respect to the direction of the force action on the fourth partial area. The force action on the first partial area is identical with respect to the absolute value and is opposite with respect to the direction of the force action on the third partial area. The force action on the second partial area is identical with respect to the absolute value and is opposite with respect to the direction of the force action on the fourth partial area.

The force action is oriented along the z direction (i.e., along detection direction DR). In the case of a rotational acceleration $d\Omega_x/dt$ around the x direction (i.e., around first direction OR), the following configuration of the force action exists on first, second, third, and fourth partial areas 9, 10, 9', 10': The force action on the first partial area is identical with respect to the absolute value and with respect to the direction of the force action on the second partial area and the force action on the third partial area is identical with respect to the absolute value and with respect to the direction of the force action on the fourth partial area. The force action on the first partial area is identical with respect to the absolute value and is opposite with respect to the direction of the force action on the third partial area. The force action is oriented along the z direction (i.e., along detection direction DR).

In the case of a linear acceleration in parallel to detection direction DR (z direction), the following configuration of the force action exists on first, second, third, and fourth partial areas 9, 10, 9', 10': The force action on the first partial area is less with respect to the absolute value and is identical with respect to the direction of the force action on the second partial area and the force action on the third partial area is less with respect to the absolute value and is identical with respect to the direction of the force action on the fourth partial area. The force action on the first partial area is identical with respect to the absolute value and with respect to the direction of the force action on the third partial area. The force action on the second partial area is identical with respect to the absolute value and with respect to the direction of the force action on the fourth partial area. The force action is oriented along the z direction (i.e., along detection direction DR).

It is provided according to the exemplary embodiments and/or exemplary methods of the present invention that, on the one hand, the attachment of first and second Coriolis masses 5, 5' on substrate 101 or on drive device 1 and, on the other hand, the arrangement and configuration of first, second, third, and fourth electrodes E9, E10, E9', E10' are provided in such a way that in the case of a rotational acceleration around first direction OR, the changes, which are caused by deflections of or force actions on first, second, third, and fourth partial areas 9, 10, 9', 10' in parallel to detection direction DR, of either first and third capacitances and second and fourth capacitances or first and second capacitances and third and fourth capacitances mutually compensate for one another. In this way, it is advantageously ensured according to the present invention that a rotational acceleration around sensitive first direction OR (in particular a rotational acceleration in the frequency range of the excitation or drive frequency) provides no contribution or only a small (or mutually compensated) contribution to the measuring signal of the yaw rate sensor.

Figure 2:
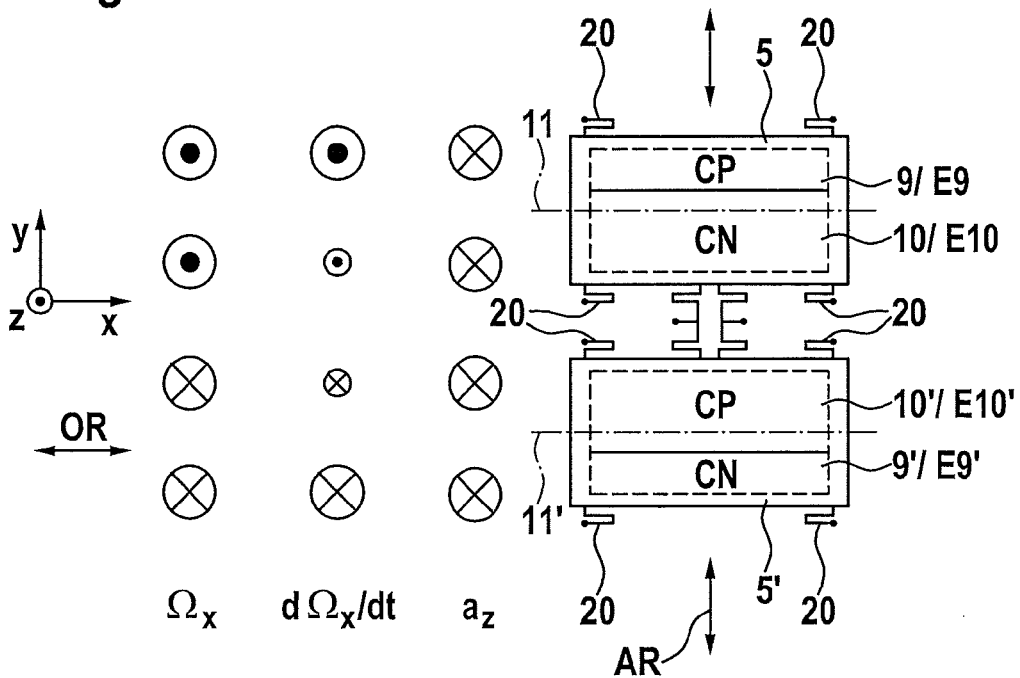
FIG. 2 shows various embodiment variants of yaw rate sensors according to the present invention.

In the first embodiment variant according to FIG. 2, it is provided that in the case of a rotational acceleration around the x direction, first and second partial areas 9, 10 (and third and fourth partial areas 9', 10') are accelerated with different strengths in parallel to the z direction. Accordingly, a compensation of the particular partial measuring signals of particular associated electrodes E9, E10, E9', E10' may take place in that first and second electrodes E9, E10 and third and fourth electrodes E9' and E10' are configured to be unequal, in particular of unequal size (with respect to their area extension in parallel to main extension plane 110).

Figure 3:
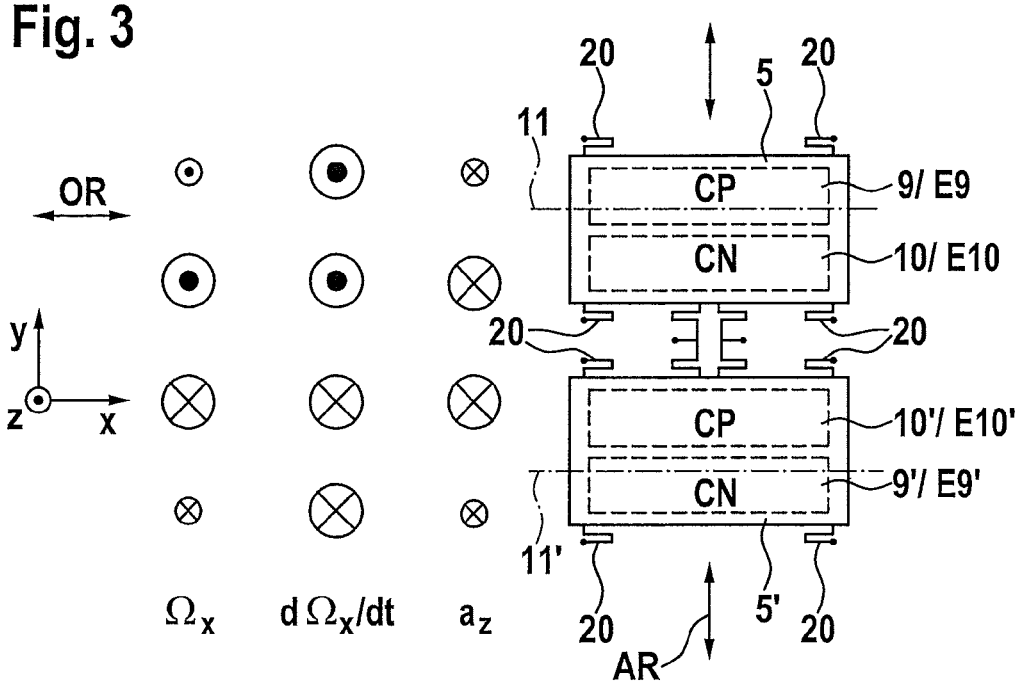
FIG. 3 shows various embodiment variants of yaw rate sensors according to the present invention.
Figure 4:
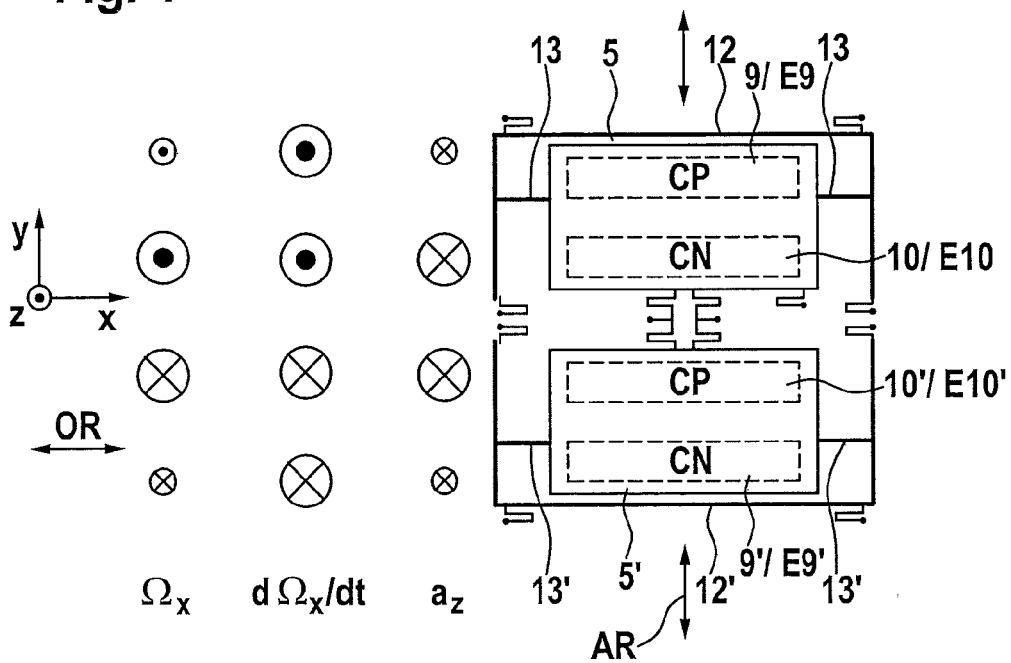
FIG. 4 shows various embodiment variants of yaw rate sensors according to the present invention.
Figure 5:
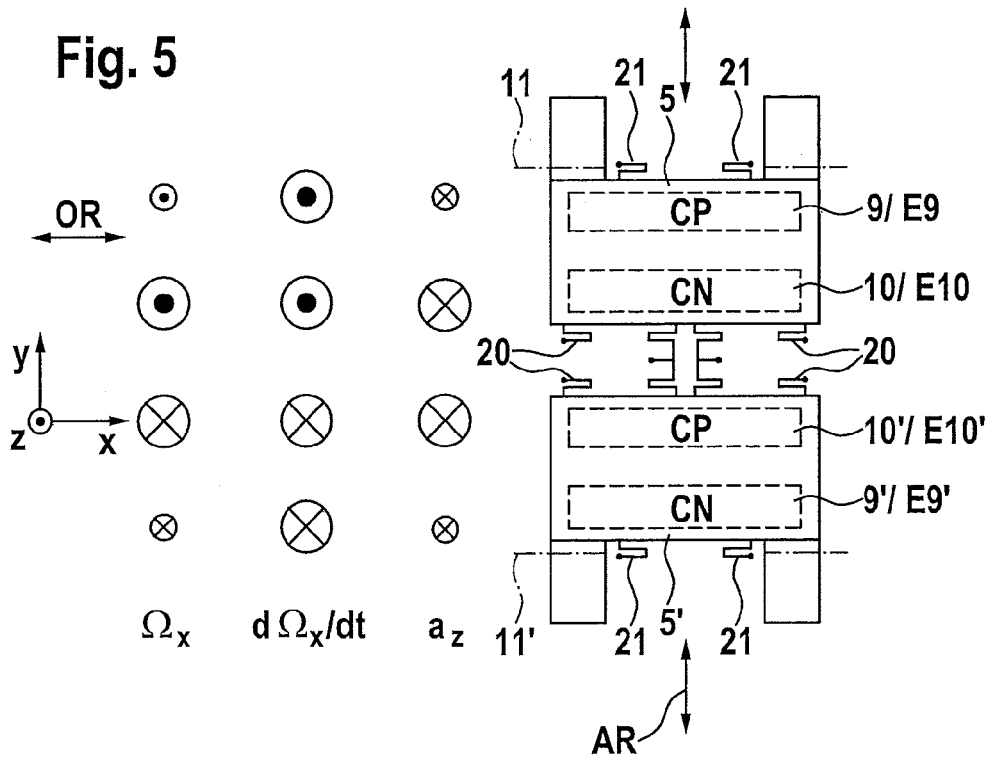
FIG. 5 shows various embodiment variants of yaw rate sensors according to the present invention.

It is provided in each case in the second, third, and fourth embodiment variants according to FIGS. 3, 4, and 5 that in the case of a rotational acceleration around the x direction, first, second, third, and fourth partial areas 9, 10, 9', 10' are accelerated with equal strength in parallel to the z direction. Correspondingly, a compensation of the particular partial measuring signals of particular associated electrodes E9, E10, E9', E10' may take place in that first, second, third, and fourth electrodes E9, E10, E9', E10' are configured to be identical, in particular of identical size (with respect to their area extension in parallel to main extension plane 110).

According to FIG. 2, Coriolis masses 5, 5' are each attached symmetrically on substrate 101 (with the aid of spring devices 20, which are soft in the drive direction and in the detection direction). A first tilting axis 11 therefore extends symmetrically (in parallel to the x direction) with respect to first Coriolis mass 5. A second tilting axis 11' also extends symmetrically (in parallel to the x direction) with respect to second Coriolis mass 5'. In the case of a yaw rate (around the x direction), an equivalent force action therefore occurs on first and second partial areas 9, 10 (or third and fourth partial areas 9', 10', respectively) of Coriolis masses 5, 5', while in the case of a rotational acceleration, due to the greater distance of first and third partial areas 9, 9' from the axis of symmetry of yaw rate sensor 100 extending in parallel to the x direction between Coriolis masses 5, 5', a greater force action results, which may be compensated for intrinsically with the aid of electrodes of different sizes according to the present invention in the analysis of the particular partial measuring signals of the electrodes.

According to FIG. 3, Coriolis masses 5, 5' are each also attached symmetrically on substrate 101 (with the aid of spring devices 20 which are soft in the drive direction and in the detection direction). However, in the case of the second embodiment variant, it is provided that there is a different mass distribution per unit area of Coriolis masses 5, 5' in parallel to main extension plane 110, and specifically with a greater mass in second and fourth partial areas 10, 10' in relation to first and third partial areas 9, 9' or with a mass distribution of Coriolis masses 5, 5' in such a way that the mass per unit area decreases with increasing distance to the axis of symmetry (between Coriolis masses 5, 5') of yaw rate sensor 100, which extends in parallel to the x direction. Accordingly, first and second tilting axes 11, 11' do not extend symmetrically (in parallel to the x direction) in relation to first Coriolis mass 5 or in relation to second Coriolis mass 5', respectively.

In the case of a yaw rate (around the x direction), a force action of different size therefore results on first and second partial areas 9, 10 (or third and fourth partial areas 9', 10', respectively) of Coriolis masses 5, 5', while in the event of a rotational acceleration, due to the greater distance of first and third partial areas 9, 9' from axis of symmetry of yaw rate sensor 100, which extends in parallel to the x direction between Coriolis masses 5, 5', but which is compensated for by the lower mass in first and third partial areas 9, 9', a force action of approximately equal size results on first, second, third, and fourth partial areas 9, 10, 9', 10', which may be intrinsically compensated for according to the present invention with the aid of electrodes E9, E10, E9', E10' of equal size in the analysis of the particular partial measuring signals of the electrodes.

However, according to FIG. 5, Coriolis masses 5, 5' are each attached asymmetrically on substrate 101. For this purpose, spring devices 20 which are soft in the drive direction and in the detection direction are provided. Moreover, further tilting spring devices 21 are provided, which are not soft in the z direction and therefore cause tilting of first and second Coriolis masses 5, 5' around first and second tilting axes 11, 11'. Accordingly, first and second tilting axes 11, 11' do not extend symmetrically (in parallel to the x direction) in relation to first Coriolis mass 5 or in relation to second Coriolis mass 5', respectively.

In the case of a yaw rate (around the x direction), a force action of different size therefore results on first and second partial areas 9, 10 (or third and fourth partial areas 9', 10', respectively) of Coriolis masses 5, 5', while in the event of a rotational acceleration, due to the greater distance of first and third partial areas 9, 9' from the axis of symmetry of yaw rate sensor 100, which extends in parallel to the x direction between Coriolis masses 5, 5', but which is compensated for by the smaller distance to respective tilting axis 11, 11' in first and third partial areas 9, 9', a force action of approximately equal amount results on first, second, third, and fourth partial areas 9, 10, 9', 10', which may be intrinsically compensated for according to the present invention in the analysis of the particular partial measuring signals of the electrodes with the aid of electrodes E9, E10, E9', E10' of identical size.

According to FIG. 4, first Coriolis mass 5 is asymmetrically attached on first drive element 12 with the aid of a first torsion suspension 13 and second Coriolis mass 5' is asymmetrically attached on second drive element 12' with the aid of a second torsion suspension 13'. First and second torsion suspensions 13, 13' are configured to be hard or comparatively hard in drive direction AR (y direction) and in detection direction DR for this purpose, but permit a torsion around first and second tilting axes 11, 11', which extend in parallel to first and second torsion suspension 13, 13'. This is possible, for example, with a configuration of first and second torsion suspension 13, 13', which is wider in the y direction than in the z direction. Accordingly, first and second tilting axes 11, 11' do not extend symmetrically (in parallel to the x direction) in relation to first Coriolis mass 5 or in relation to second Coriolis mass 5', respectively.

In the case of a yaw rate (around the x direction), a force action of different sizes therefore results on first and second partial areas 9, 10 (or third and fourth partial areas 9', 10', respectively) of Coriolis masses 5, 5', while in the event of a rotational acceleration, due to the greater distance of first and third partial areas 9, 9' from the axis of symmetry of yaw rate sensor 100, which extends in parallel to the x direction between Coriolis masses 5, 5', but which is compensated for by the lesser distance to respective tilting axis 11, 11' (or to respective torsion suspension 13, 13') in first and third partial area 9, 9', a force action of approximately equal amount results on first, second, third, and fourth partial areas 9, 10, 9', 10', which may be intrinsically compensated for in the analysis of the particular partial measuring signals of the electrodes with the aid of electrodes E9, E10, E9', E10' of identical size according to the exemplary embodiments and/or exemplary methods of the present invention.

What is claimed is:

1. A yaw rate sensor, comprising:
   a substrate, which has a main extension plane, for detecting a yaw rate around a first direction extending in parallel to the main extension plane;

a drive device;

a first Coriolis mass;

a second Coriolis mass, the drive device being configured to drive the first Coriolis mass and the second Coriolis mass in parallel to a drive direction, which extends perpendicularly to the first direction, the first Coriolis mass and the second Coriolis mass, in the case of a yaw rate around the first direction, experiencing a Coriolis acceleration in parallel to a detection direction, which extends perpendicularly to both the drive direction and perpendicularly to the first direction, the yaw rate sensor having an axis of symmetry which extends in parallel to the first direction with respect to the Coriolis masses, wherein the first Coriolis mass has a first partial area and a second partial area, the second Coriolis mass has a third partial area and a fourth partial area, the first partial area and the third partial area being situated farther away from the axis of symmetry extending in parallel to the first direction, and the second partial area and the fourth partial area being situated closer to the axis of symmetry extending in parallel to the first direction;

a first electrode, which forms a first capacitance with the first partial area, is situated opposite to the first partial area;

a second electrode, which forms a second capacitance with the second partial area, is situated opposite to the second partial area;

a third electrode, which forms a third capacitance with the third partial area, is situated opposite to the third partial area;

a fourth electrode, which forms a fourth capacitance with the fourth partial area, is situated opposite to the fourth partial;

wherein an attachment of the first Coriolis mass and the second Coriolis mass is on the substrate or on the drive device, wherein the configurations of the first, second, third, and fourth electrodes are provided so that for a rotational acceleration around the first direction, the changes, which are caused by the deflections of or force effects on the first, second, third, and fourth partial areas are in parallel to the detection direction, of either the first and third capacitances and the second and fourth capacitances or the first and second capacitances and the third and fourth capacitances mutually compensate for one another, wherein the first partial area and the second partial area have different masses per unit area in parallel to the main extension plane of the first Coriolis mass, and the third partial area and the fourth partial area have different masses per unit area in parallel to the main extension plane of the second Coriolis mass.

2. The yaw rate sensor of claim 1, wherein the drive device has a first drive element and a second drive element, the first drive element driving the first Coriolis mass in parallel to the drive direction and the second drive element driving the second Coriolis mass in parallel to the drive direction, the first Coriolis mass being configured so it is tiltable around a first tilting axis in parallel to the first direction in relation to the first drive element, and the second Coriolis mass is tiltable around a second tilting axis in parallel to the first direction relative to the second drive element.

3. The yaw rate sensor of claim 1, wherein the first Coriolis mass is connected to the first drive element with a first torsion suspension in the area of the first tilting axis, and the second Coriolis mass is connected to the second drive element with a second torsion suspension in the area of the second tilting axis.

4. The yaw rate sensor of claim 1, wherein the drive device is configured to drive the first Coriolis mass and the second Coriolis mass in opposite directions to one another in the drive direction.

5. The yaw rate sensor of claim 1, wherein the drive device has a drive frame, the drive frame having four angled elements, which are attached in the corners of the frame so they may be rotationally deflected on the substrate, each two of the angled elements being connected to one another via U-shaped spring elements.

6. A yaw rate sensor, comprising:

a substrate, which has a main extension plane, for detecting a yaw rate around a first direction extending in parallel to the main extension plane;

a drive device;

a first Coriolis mass;

a second Coriolis mass, the drive device being configured to drive the first Coriolis mass and the second Coriolis mass in parallel to a drive direction, which extends perpendicularly to the first direction, the first Coriolis mass and the second Coriolis mass, in the case of a yaw rate around the first direction, experiencing a Coriolis acceleration in parallel to a detection direction, which extends perpendicularly to both the drive direction and perpendicularly to the first direction, the yaw rate sensor having an axis of symmetry which extends in parallel to the first direction with respect to the Coriolis masses, wherein the first Coriolis mass has a first partial area and a second partial area, the second Coriolis mass has a third partial area and a fourth partial area, the first partial area and the third partial area being situated farther away from the axis of symmetry extending in parallel to the first direction, and the second partial area and the fourth partial area being situated closer to the axis of symmetry extending in parallel to the first direction;

a first electrode, which forms a first capacitance with the first partial area, is situated opposite to the first partial area;

a second electrode, which forms a second capacitance with the second partial area, is situated opposite to the second partial area;

a third electrode, which forms a third capacitance with the third partial area, is situated opposite to the third partial area;

a fourth electrode, which forms a fourth capacitance with the fourth partial area, is situated opposite to the fourth partial;

wherein an attachment of the first Coriolis mass and the second Coriolis mass is on the substrate or on the drive device, wherein the configurations of the first, second, third, and fourth electrodes are provided so that for a rotational acceleration around the first direction, the changes, which are caused by the deflections of or force effects on the first, second, third, and fourth partial areas are in parallel to the detection direction, of either the first and third capacitances and the second and fourth capacitances or the first and second capacitances and the third and fourth capacitances mutually compensate for one another, wherein the mass per unit area in parallel to the main extension plane of the first Coriolis mass decreases with increasing distance from the axis of symmetry of the yaw rate sensor extending in parallel to the first direction, and the mass per unit area in parallel to the main extension plane of the second Coriolis mass decreases with increasing distance from the axis of symmetry of the yaw rate sensor extending in parallel to the first direction.

7. A yaw rate sensor, comprising:
a substrate, which has a main extension plane, for detecting a yaw rate around a first direction extending in parallel to the main extension plane;
a drive device;
a first Coriolis mass;
a second Coriolis mass, the drive device being configured to drive the first Coriolis mass and the second Coriolis mass in parallel to a drive direction, which extends perpendicularly to the first direction, the first Coriolis mass and the second Coriolis mass, in the case of a yaw rate around the first direction, experiencing a Coriolis acceleration in parallel to a detection direction, which extends perpendicularly to both the drive direction and perpendicularly to the first direction, the yaw rate sensor having an axis of symmetry which extends in parallel to the first direction with respect to the Coriolis masses,
wherein the first Coriolis mass has a first partial area and a second partial area, the second Coriolis mass has a third partial area and a fourth partial area, the first partial area and the third partial area being situated farther away from the axis of symmetry extending in parallel to the first direction, and the second partial area and the fourth partial area being situated closer to the axis of symmetry extending in parallel to the first direction;
a first electrode, which forms a first capacitance with the first partial area, is situated opposite to the first partial area;
a second electrode, which forms a second capacitance with the second partial area, is situated opposite to the second partial area;
a third electrode, which forms a third capacitance with the third partial area, is situated opposite to the third partial area;
a fourth electrode, which forms a fourth capacitance with the fourth partial area, is situated opposite to the fourth partial;
wherein an attachment of the first Coriolis mass and the second Coriolis mass is on the substrate or on the drive device,
wherein the configurations of the first, second, third, and fourth electrodes are provided so that for a rotational acceleration around the first direction, the changes, which are caused by the deflections of or force effects on the first, second, third, and fourth partial areas are in parallel to the detection direction, of either the first and third capacitances and the second and fourth capacitances or the first and second capacitances and the third and fourth capacitances mutually compensate for one another,
wherein, for a rotational acceleration around the first direction, the force action, in parallel to the detection direction, on the first partial area and the third partial area is greater than the force action, in parallel to the detection direction, on the second partial area and on the fourth partial area, and the area in parallel to the main extension plane of the first electrode and the third electrode is smaller than the area in parallel to the main extension plane of the second electrode and the fourth electrode.

8. A yaw rate sensor, comprising:
a substrate, which has a main extension plane, for detecting a yaw rate around a first direction extending in parallel to the main extension plane;
a drive device;
a first Coriolis mass;
a second Coriolis mass, the drive device being configured to drive the first Coriolis mass and the second Coriolis mass in parallel to a drive direction, which extends perpendicularly to the first direction, the first Coriolis mass and the second Coriolis mass, in the case of a yaw rate around the first direction, experiencing a Coriolis acceleration in parallel to a detection direction, which extends perpendicularly to both the drive direction and perpendicularly to the first direction, the yaw rate sensor having an axis of symmetry which extends in parallel to the first direction with respect to the Coriolis masses,
wherein the first Coriolis mass has a first partial area and a second partial area, the second Coriolis mass has a third partial area and a fourth partial area, the first partial area and the third partial area being situated farther away from the axis of symmetry extending in parallel to the first direction, and the second partial area and the fourth partial area being situated closer to the axis of symmetry extending in parallel to the first direction;
a first electrode, which forms a first capacitance with the first partial area, is situated opposite to the first partial area;
a second electrode, which forms a second capacitance with the second partial area, is situated opposite to the second partial area;
a third electrode, which forms a third capacitance with the third partial area, is situated opposite to the third partial area;
a fourth electrode, which forms a fourth capacitance with the fourth partial area, is situated opposite to the fourth partial;
wherein an attachment of the first Coriolis mass and the second Coriolis mass is on the substrate or on the drive device,
wherein the configurations of the first, second, third, and fourth electrodes are provided so that for a rotational acceleration around the first direction, the changes, which are caused by the deflections of or force effects on the first, second, third, and fourth partial areas are in parallel to the detection direction, of either the first and third capacitances and the second and fourth capacitances or the first and second capacitances and the third and fourth capacitances mutually compensate for one another,
wherein, for a rotational acceleration around the first direction, the force action, in parallel to the detection direction, on the first partial area, the second partial area, the third partial area, and the fourth partial area is of equal size, and the area in parallel to the main extension plane of the first electrode, the second electrode, the third electrode, and the fourth electrode is of equal size.

* * * * *